Nov. 30, 1954     F. L. PARSONS     2,695,819
TRACTION TREAD FOR VEHICLES
Filed Aug. 24, 1953     4 Sheets-Sheet 1
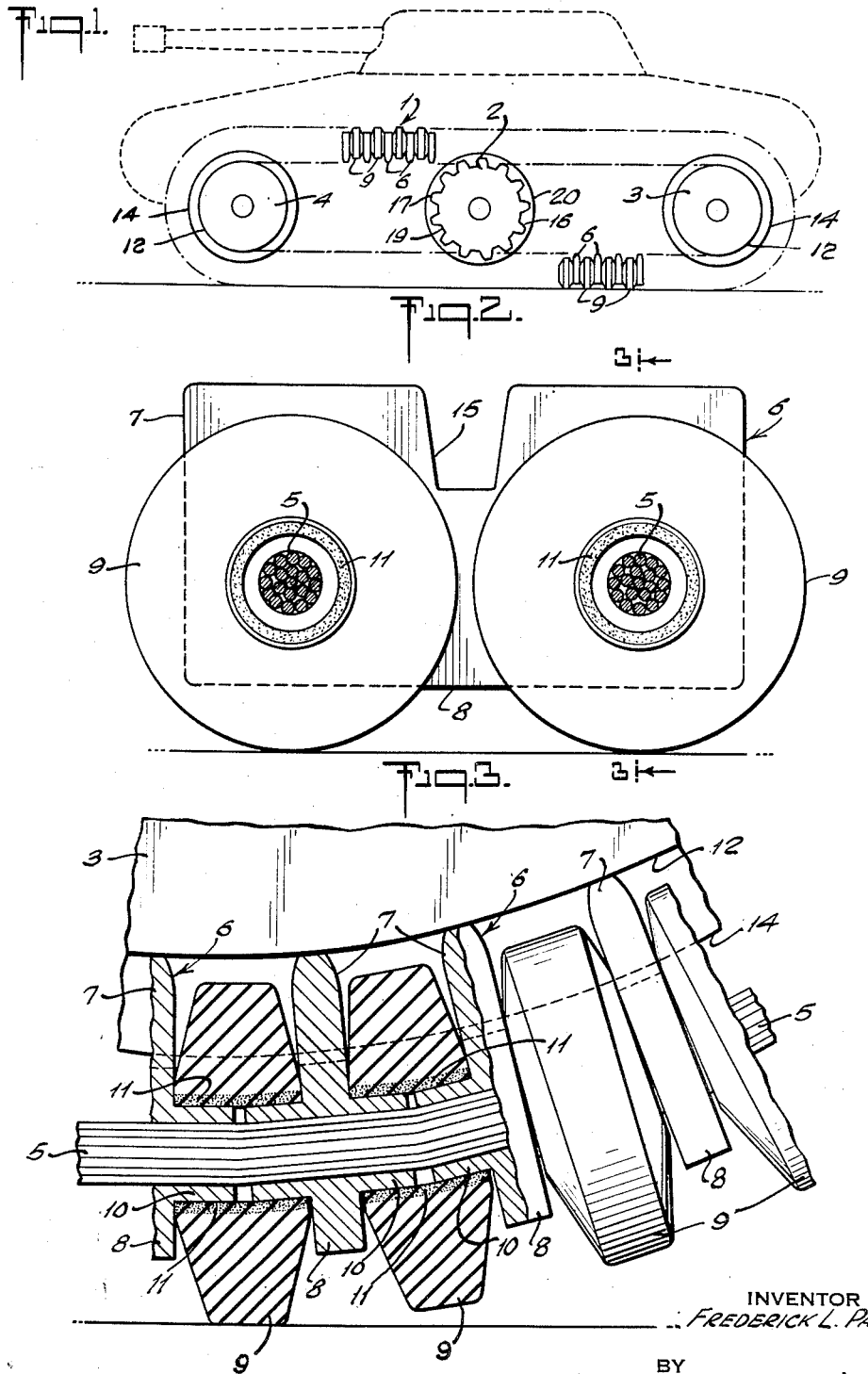
INVENTOR
FREDERICK L. PARSONS
BY
James B. Grant
ATTORNEY Nov. 30, 1954  F. L. PARSONS  2,695,819
TRACTION TREAD FOR VEHICLES
Filed Aug. 24, 1953  4 Sheets-Sheet 2
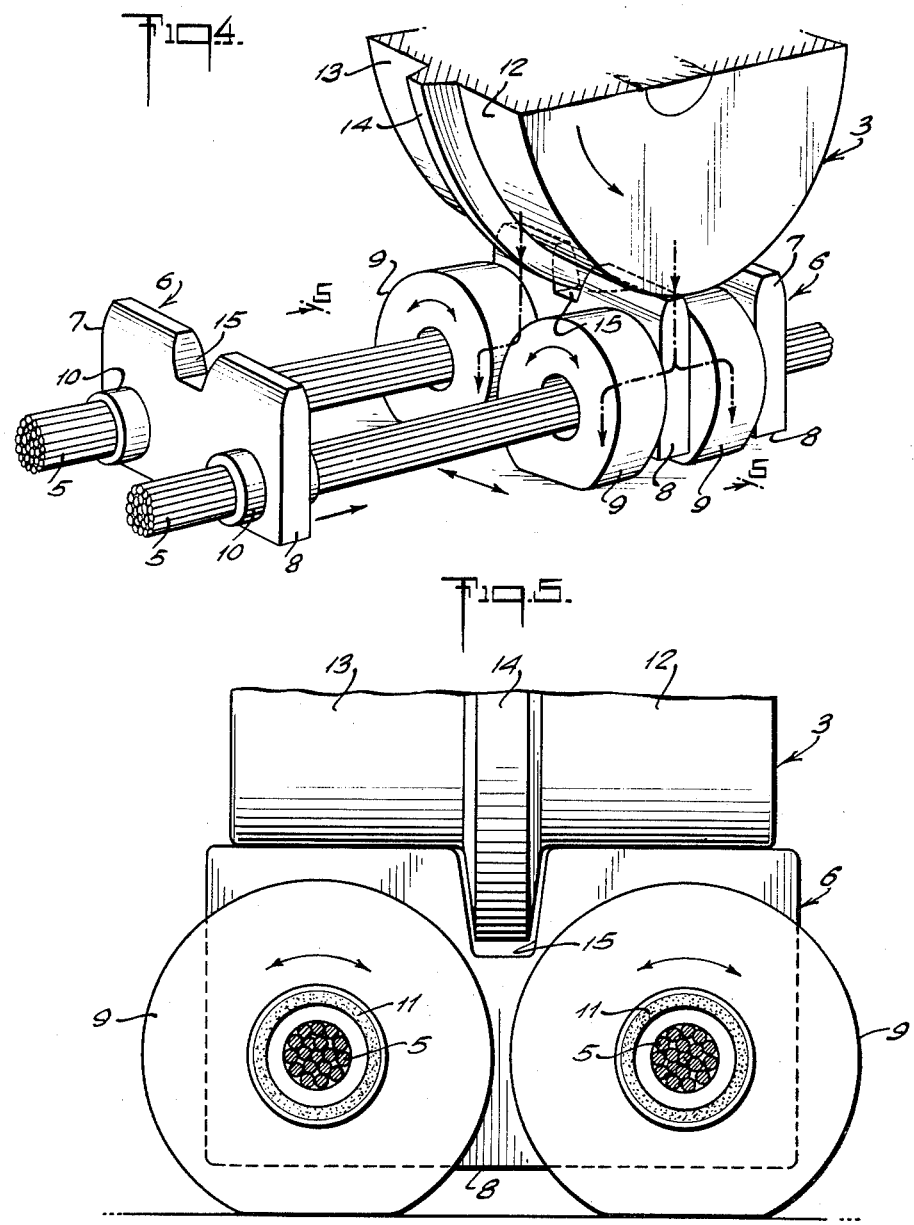
INVENTOR
FREDERICK L. PARSONS
BY
James B. Grant
ATTORNEY Nov. 30, 1954
F. L. PARSONS
2,695,819
TRACTION TREAD FOR VEHICLES
Filed Aug. 24, 1953
4 Sheets-Sheet 3
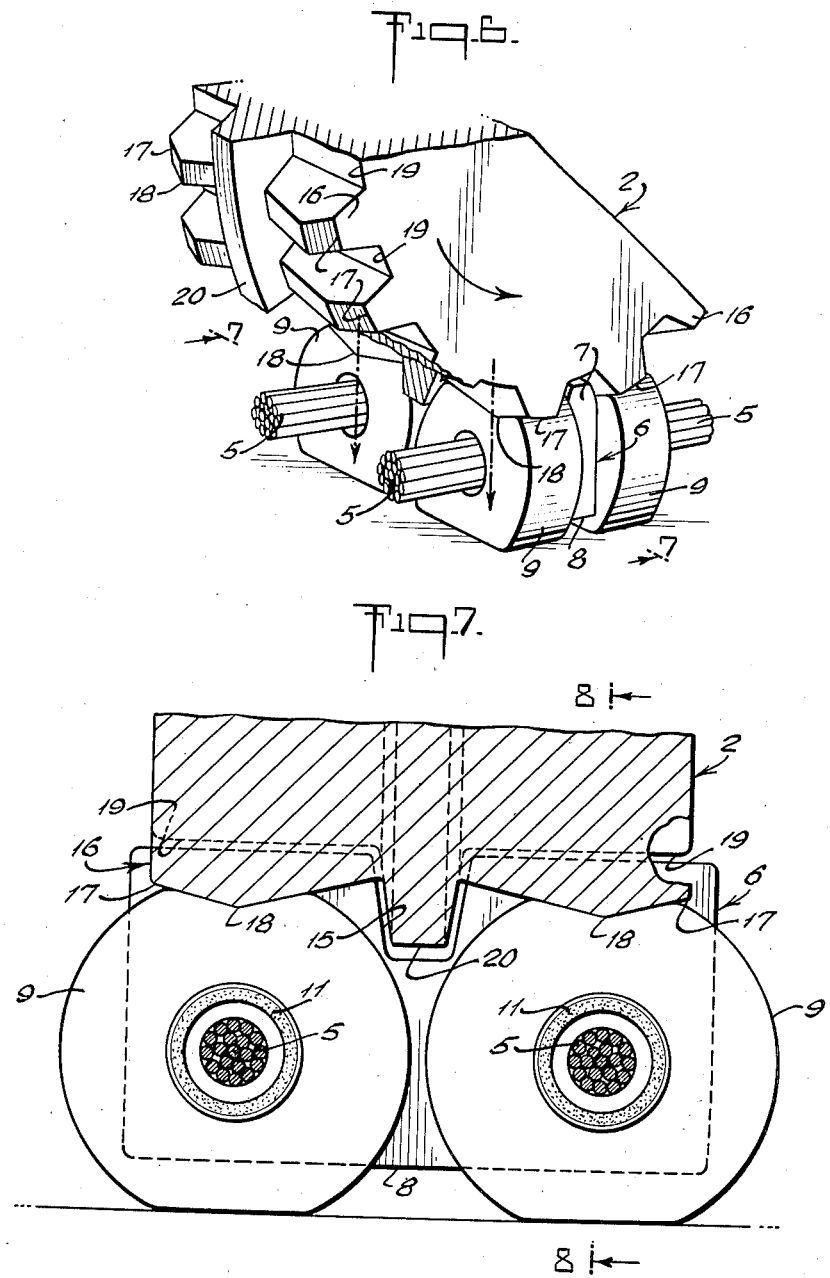
INVENTOR
FREDERICK L. PARSONS
BY
James B. Grant
ATTORNEY Nov. 30, 1954   F. L. PARSONS   2,695,819
TRACTION TREAD FOR VEHICLES
Filed Aug. 24, 1953   4 Sheets-Sheet 4

INVENTOR
FREDERICK L. PARSONS
BY
James B. Grant
ATTORNEY

United States Patent Office 2,695,819
Patented Nov. 30, 1954

2,695,819

TRACTION TREAD FOR VEHICLES

Frederick L. Parsons, Ridgewood, N. J.

Application August 24, 1953, Serial No. 376,030

5 Claims. (Cl. 305—8)

This invention relates to traction means for vehicles and more particularly to an improved continuous tread for tractors, tanks and other vehicles in which the tread consists of a series of connected and alternately placed rollers and spacers. An object is to provide a traction tread for vehicles which will enable the vehicle to be operated with greater maneuverability than has heretofore been known in the art.

Another object of this invention is to provide a more efficient traction drive using a continuous tread.

A further object is to provide a tractor tread which may be subjected to constant use at substantially lower maintenance cost and with greater wearability as contrasted with conventional treads.

A further object is to provide a tread which enables the tractor or tank operator to rotate the machine around its center in a horizontal plane perpendicular to the direction of forward movement with a minimum of friction.

A further object is to provide a traction engine having a minimum turning radius with the least amount of applied power.

A further object is to provide a tread which is more economical to manufacture.

A further object is to provide a tread which may be readily removed and replaced as necessary.

A further object is to provide a tread which will require no lubrication.

A further object is to provide a tread of lighter weight than metal treads presently used.

The invention employs a continuous tread comprising a flexible cable mounting a series of rollers or discs regularly spaced along the cable and accommodating spacers which engage the drive wheel of the traction engine. The invention will be more fully understood by reference to the following drawings in which:

Fig. 1 is a side view of the arrangement of the tread linkage as used on a traction vehicle.

Fig. 2 shows the construction of the flexible cable, rollers and spacers.

Fig. 3 is a side view in section taken along the line 3—3 of Fig. 2 and looking in the direction of the arrows.

Fig. 4 is a perspective view showing engagement of the tread with an idler wheel.

Fig. 5 is a frontal view in section taken along the line 5—5 of Fig. 4.

Fig. 6 is a perspective view showing engagement of the tread with a drive wheel.

Fig. 7 is a frontal view in section taken along line 7—7 of Fig. 6.

Figure 8:
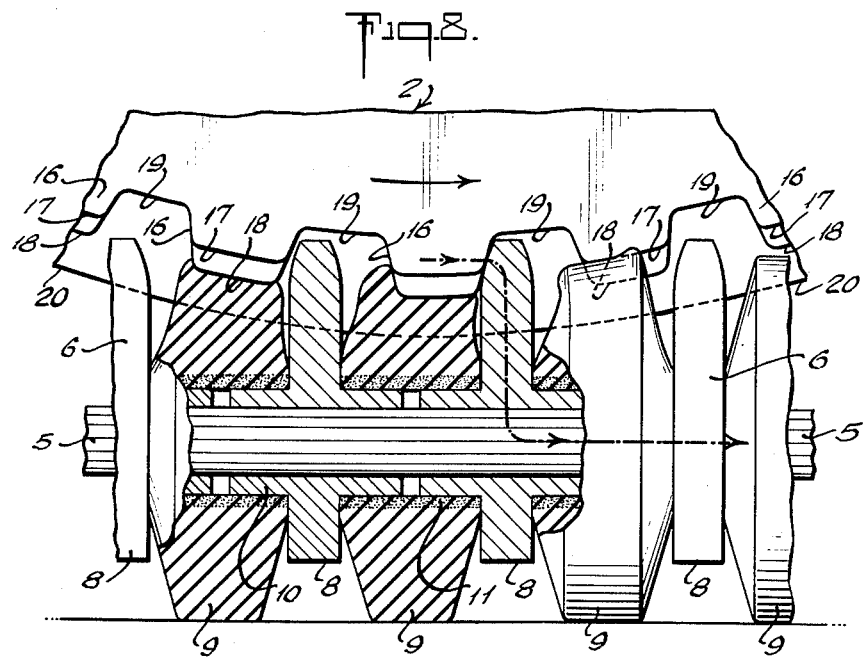
Fig. 8 is a side view in section, taken along the line 8—8 of Fig. 7 and looking in the direction of the arrows, showing the tread units and spacers engaging the drive wheel.

With reference to the accompanying drawings, Fig. 1 shows a side view of a powered vehicle using the continuous tread 1 which is driven by drive wheel 2 and travels at either end around idler wheels 3 and 4. The tread is held together as an integral unit by a flexible cable or cables 5 as shown in Fig. 2.

The cable 5 forms a continuous loop around drive wheel 2 and idlers 3 and 4. The continuous cable 5 may consist of a number of strands as shown in Fig. 3, or may be a single unit. A series of spacers 6 are located at regular intervals along the cable to which they are perpendicular. The spacers may be threaded on the cable or mounted by any conventional means. Each spacer has a dog 7 located along the inner periphery of the continuous tread. A shorter projection 8 at the outer side of each spacer serves to maintain the rollers 9 in place during rotation of the tread. These spacers may be manufactured from cast iron or any other suitable, durable material of heavy tensile strength. The spacers are mounted integral with cable 5 and should not rotate about the cable. A spacer sleeve 10 extends length-wise from each spacer along the cable. The outer surface of each spacer sleeve 10 should be machined to a smooth finish to provide a bearing surface for roller 9. Each roller is manufactured from rubber or other flexible material which will impart good riding qualities to the traction vehicle. A bearing surface 11 on the inner circumference of each roller may be provided by impregnating the rubber or other material with graphite. Alternatively a suitable bearing may be bonded to the roller to serve this purpose. It should be noted that a small clearance is allowed between the ends of sleeves 10. This clearance permits compression of roller 9 during rotation of the tread when the turning radius of the tread is decreased. This occurs, for example, when the tread is passing over the idler wheel 3 or 4.

Fig. 4 shows the tread in engagement with idler wheel 3. In the version of the invention shown in the drawing, each tread consists of two parallel cables 5 interconnected by spacers 6 which prevents rotation of the spacer about the axis of the cable, although a single cable adaptation of the invention is entirely feasible. In the present version of the invention each cable mounts a separate roller 9. Idler wheel 3 is designed with smooth flats 12 and 13 on each side of its circumference. At the middle or center part of its circumferential surface a raised ridge 14 serves to engage guide slot 15 of spacer 6. This arrangement prevents the tread from sliding off the idler wheels at either end of the vehicle. A frontal view of this arrangement with respect to the idler wheel is shown in Fig. 5.

With reference again to Fig. 5 it will be seen that idler wheel 3 is not in contact with rollers 9 at any point, nor do rollers 9 come in contact with each other. Therefore it is possible for the rollers to rotate about cable 5 on the bearing surface of sleeve 10 at any time during the course of travel of the tread about idler wheel 3. Rollers 9 are likewise free to rotate in a plane normal to the axis of the cable at any point of travel except during contact with the driving wheel 2 as will be hereinafter explained. When the idler wheel 3 is in contact with spacer 6 as shown in Figs. 4 and 5 the entire load at that point is transmitted thru the spacer bearing 10 to the roller and thence to the ground. In this condition the roller can roll sideways when influenced by a side load.

Figure 9:
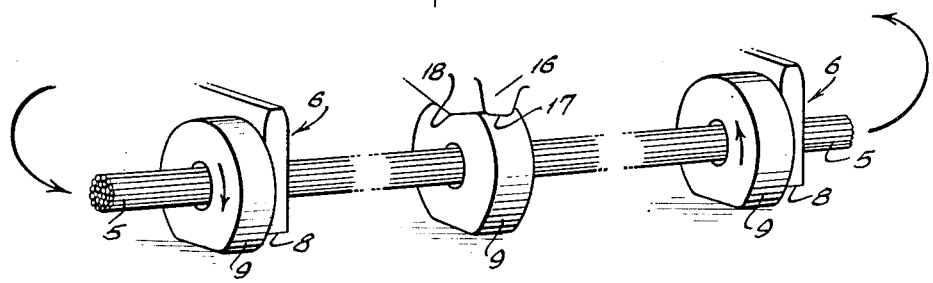
Fig. 9 is a perspective view showing the arrangement of spacers and rollers on the flexible cable.

Turning now to Figs. 6 and 7 drive wheel 2 is designed to have teeth 16 at either side of its outer circumference. The lands 17 of these teeth have obtuse points 18 to impinge on rollers 9 during periods when the tread is in engagement with drive wheel 2. During engagement each roller is locked in place so that it cannot move about its axis of rotation on bearing surface 10. Thus during the engagement of rollers 9 by teeth 16 the part of the traction vehicle at which the drive wheel is located serves as a pivoting point while the rollers not in engagement with the drive wheel may rotate about their axis in either direction as shown in Figs. 9A, 9B and 9C.

During engagement with the driving wheel, dogs 7 at the inner peripheral extremities of spacers 6 engage groove 19 of drive wheel 2. The driving force of drive wheel 2 is thus applied solely to the spacers 10 in much the same manner as a rack engages a pinion. This driving force is positive and is not derived by means of friction, the latter method being common to the prior art. Ridge 20 on drive wheel 2 rides in slot 15 of each spacer as was the case with the idler wheel. Ridge 20 likewise prevents the tread from sliding laterally off its track. The interaction between the drive wheel and tread is shown in detail in Fig. 8. In operation either tread of the traction vehicle may be stopped or retarded by suitable braking means. The entire traction unit will then pivot around the middle or non-rolling portion of the track. The other portions of the tract in contact with the ground are entirely free to rotate laterally or travel in varying degrees dependent upon their position relative to the pivot point. The traction vehicle will never inadvertently slide side-ways in hilly terrain as the central rollers in contact with the driving wheel are always locked regardless of whether the vehicle is stationary or moving forward or backwards.

What is claimed is:

1. In a traction device, the combination of a drive wheel and a continuous tread consisting of spacers and rollers alternately mounted on a flexible cable, said drive wheel having regular teeth around its periphery and said spacers extending inwardly to engage said teeth, and said rollers being rotatable about the axis of said cable.

2. A traction system comprising a drive wheel, at least one idler wheel and a continuous tread including a flexible cable mounting spacers and rollers, said drive wheel being adapted to engage said spacers and said rollers being free to rotate about the axis of said cable.

3. A traction system in accordance with claim 2 in which said spacers extend outwardly from said flexible cable a lesser distance than said rollers.

4. In a traction device, the combination of a drive wheel and a continuous tread consisting of connected spacers and rollers, said drive wheel being adapted around its periphery to engage said spacers, and said rollers being rotatable about the axis of said tread, in which said spacers have channels to engage a ridge on the periphery of said drive wheel.

5. A traction device comprising at least one drive wheel, at least one idler wheel, and a continuous tread including spacers and rollers, said spacers being engageable with said drive wheel and said rollers being rotatable about the axis of said tread, in which said spacers extend inwardly to engage said drive wheel a greater distance than said rollers, and said rollers extend outwardly a greater distance than said spacers.

No references cited.